May 3, 1955 G. ELLIOTT ET AL 2,707,728
CONNECTOR
Filed Oct. 28, 1952
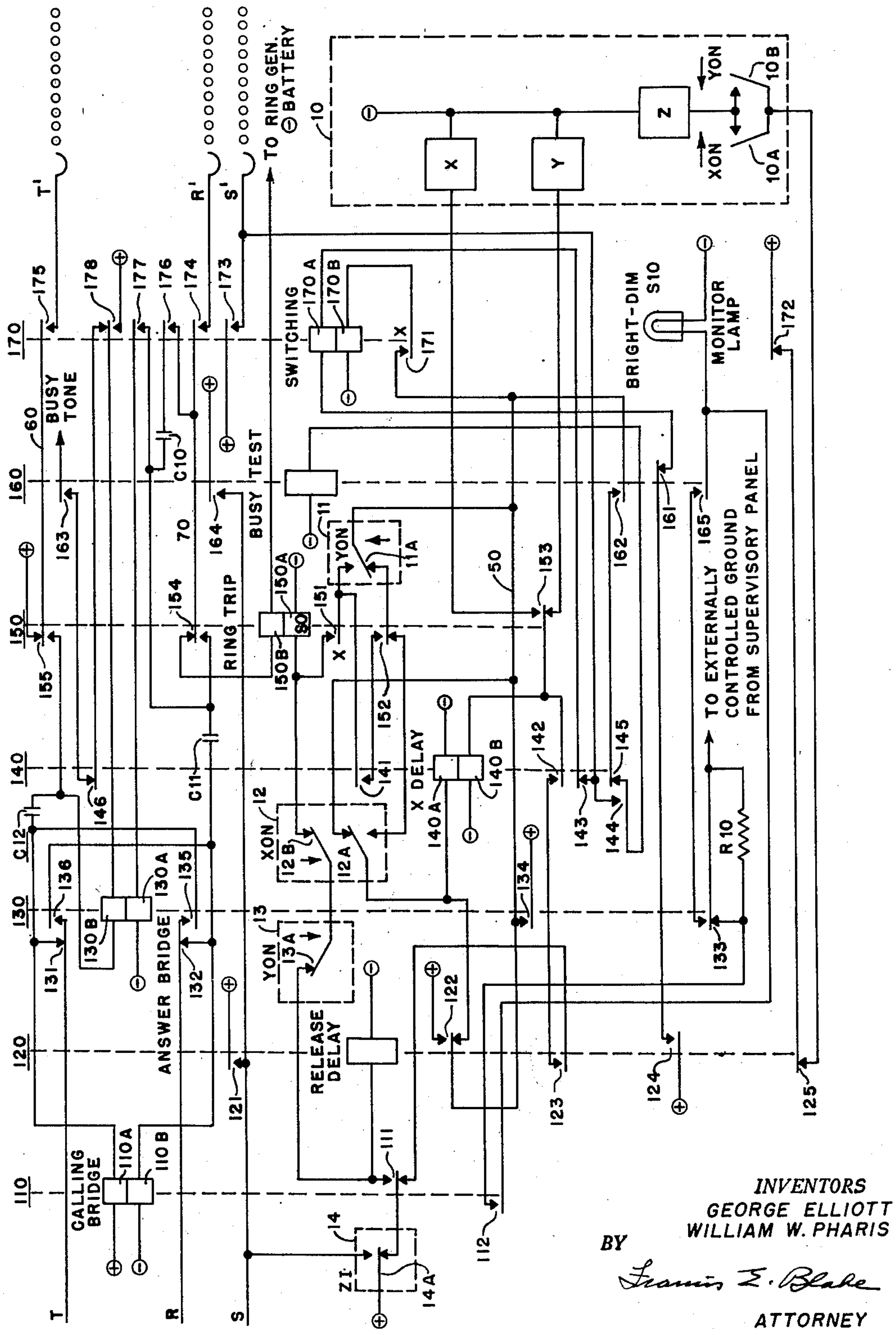
INVENTORS
GEORGE ELLIOTT
WILLIAM W. PHARIS
BY *Francis E. Blake*
ATTORNEY United States Patent Office 2,707,728

Patented May 3, 1955

2,707,728

CONNECTOR

George Elliott and William W. Pharis, Rochester, N. Y., assignors to Stromberg-Carlson Company, a corporation of New York Application October 28, 1952, Serial No. 317,292

13 Claims. (Cl. 179—18)

The present invention relates to dial telephone systems and more particularly to improved connectors for use with dial telephone systems.

Dial telephone systems that are directively controlled in response to dial impulses generally employ a number of selectable circuits such as trunk circuits, selector circuits, and connector circuits which may each have several different conditions of operation. For example, such circuits may be in the free or idle condition ready for seizure by other circuits; they may be seized by other circuits but not in the talking condition; or they may be seized and in the talking condition. In monitoring the operation of automatic telephone systems, it is desirable to be able to ascertain at a glance the operative condition of the circuit; i. e. idle, seized or seized and in the talking condition.

It is an important object of the present invention to provide an improved connector having visual signal means to indicate its various conditions of operation.

A feature of the invention is the provision of a signal lamp to be brightly illuminated when the connector is seized by either preceding or succeeding circuits but not in the talking condition and to be dimly illuminated when the connector is in the talking condition, the arrangement being such that the lamp is not illuminated when the connector is idle thus conserving power.

The conservation of power and the simplification of the relay circuit arrangements used in the connector are very desirable from the standpoint of economy in manufacture and reliability of operation. Various release delay relays are used to differentiate between groups of dial impulses corresponding to successive digits for obtaining different operations of the connector switch mechanism. For example, when using a flat two motion switch as a connector, the connector circuits of the prior art have used a so-called X-delay relay to be energized during the first group of dial impulses in which the switch is controlled thereby to be moved in the X direction and a Y-delay relay to be energized during the second group of impulses in which the switch is controlled thereby to be moved in the Y direction. Other relays have also been provided in the connector circuits of the prior art such as for example, a ring trip relay which functions to stop the application of ringing current to the called line when the called party answers.

Another important object of the present invention is to provide a more reliable and simplified connector having a minimum number of relays and using a single release delay relay in two consecutive different applications for responding to first and second groups of dial impulses and thereby controlling the movement of a connector in two respective successive directions.

A feature of the invention to obtain a simplified connector is the use of the conventional ring trip relay having normal functions and in addition being arranged for controlling the connections of the dial impulse group responsive release delay relay with the connector switch in such manner that the ring trip relay and release delay relay are both operated during the first group of dial impulses to thereby connect the release delay relay in a manner to enable the switch to be operated in one direction and that the release delay relay and ring trip relay are restored and the release delay relay only reoperated during the second group of dial impulses to thereby connect the reoperated release delay relay in a manner to enable the switch to be operated in the other direction.

Further objects, features, and the attending advantages of the invention will be apparent with reference to the following specification and drawings in which the sole figure is a circuit diagram of the improved connector switch circuit.

Referring to the drawing, it should be understood that the connector circuit of the invention is intended to be used to control the directive operation of a two motion stepping switch which may have means to directively move the switch such as stepping magnets X and Y, and a release magnet Z for returning the switch to normal position. The X, Y and Z magnets are shown to be enclosed by the dotted lines at 10. Off-normal switch contacts which are operated when the switch moves off-normal in either direction, such as the X off-normal and Y off-normal contacts, are also shown to be enclosed within the dotted line 10 and as detached contacts within dotted lines 11—13. The switch contacts shown to be enclosed within the dotted lines 14 are release magnet contacts ZI which are operated when the release magnet Z is energized. It should also be understood that the relay circuit of the drawing is powered from a conventional direct current source (not shown), and that the positive terminal of such direct current source is grounded and will hereinafter be referred to as ground and identified on the drawing by a plus sign, while the negative terminal will be referred to as battery and identified on the drawing by a minus sign.

The connector circuit of the invention may be used in any automatic telephone system having at least tip, ring and sleeve conductors for the selectable circuits. In the drawing the incoming tip, ring and sleeve conductors of the connector circuit are identified as T, R and S, respectively, while the outgoing tip, ring and sleeve conductors are connected to switch brushes T', R' and S' which are directively moved into engagement with a selected group of switch bank wires to the desired called line circuit. Assuming the connector circuit of the invention to be idle as indicated by an absence of ground on the sleeve conductor S, the connector circuit may be seized by preceding automatic telephone circuits such as a selector circuit or the like. Seizure of the connector circuit completes a loop circuit across the incoming tip and ring conductors to operate the calling bridge relay 110 from ground through winding 110A, normal contacts 131, T and R conductors, normal contacts 132 and winding 110B to battery. The operation of the calling bridge relay 110 closes contacts 111 to operate the release delay relay 120 from battery through operated contacts 111 and normal contacts 14A of the release magnet switch ZI to ground. The operation of the calling bridge relay 110 also closes contacts 112 to brightly illuminate the monitor signal lamp S10 from battery through operated contacts 112 and normal contacts 133 to ground from an externally controlled source which may be a key on a supervisory panel (not shown). Thus, according to the invention, the seizure of the connector circuit by another telephone circuit is indicated by the bright illumination of the monitor lamp S10 which has previously been not illuminated when the connector circuit was idle. The seizure of the connector circuit and the consequent operation of relays 110 and 120 connects ground at operated contacts 121 to the incoming sleeve conductor S to identify the connector circuit as busy.

The aforementioned operation of the release delay relay 120 causes the operation of the X-delay relay 140 from ground through operated contacts 122 and normal contacts 12A of the X off-normal switch 12 to winding 140A and battery. At the same time, the ring trip relay 150 is operated by the circuit from ground including release magnet contacts 14A, operated contacts 111, normal contacts 13A of Y off-normal switch 13, and normal contacts 12B of X off-normal switch 12 to winding 150A and battery. The operation of the ring trip relay 150 closes a holding circuit for itself through preliminary make contacts 151, operated contacts 141, 152 and normal contacts 11A of the Y off-normal switch 11 to the master ground on conductor 50 as provided by operated contacts 122. Thus in such manner, the initial seizure of the connector circuit results in the immediate operation of the relays 110, 120, 140 and 150 with relay 150 locked up through the above described locking circuit including the off-normal contacts 11A and the operated contacts 141 of X-delay relay 140.

The connector circuit is now ready for operation in response to the first group of dial impulses to cause the stepping magnet X to step the switch in the first or X direction. It will be noted that the operation of the ring trip relay 150 closed contacts 153 to establish a circuit for energizing the stepping magnet X in parallel with the winding 140B of the X-delay relay 140, through operated contacts 142 and 123 when the calling bridge relay 110 is released on the first dial impulses to restore contacts 111 to normal, and complete the circuit to ground through the normal release magnet contacts 14A. Thus, contacts 111 are pulsed from operated to normal conditions in response to the first group of dial impulses, and the stepping magnet X is operated simultaneously with the energization of the winding of X-delay relay 140 which is thereby maintained operated during the first group of dial impulses. It will be noted in this connection that winding 140A of the X-delay relay 140 is deenergized after the first dial impulse since its operating circuit is now open at operated contacts 12A of the X off-normal switch 12 which is operated as soon as the switch steps off-normal in the X direction in response to the energizing of the stepping magnet X. At the completion of the first group of dial impulses the calling bridge relay 110 and contacts 111 remain operated to open the circuit to the winding 140B of the X-delay relay which then restores due to the greater time intervals between groups of dial impulses.

The restoration of the X-delay relay 140 restores operated contacts 141 to normal which breaks the holding circuit for ring trip relay 150 through winding 150A, and since X off-normal switch contacts 12B are now operated, the ring trip relay 150 restores. The consequent restoration of ring trip relay 150 causes the X-delay relay 140 to be reoperated from master ground on conductor 50 through Y off-normal switch normal contacts 11A, normal contacts 152, and operated X off-normal contacts 12A to winding 140A and battery. With the X-delay relay 140 again operated and ring trip relay 140 restored, contacts 153 are restored to normal thereby establishing a circuit for energizing the stepping magnet Y in parallel with the winding 140B of the X-delay relay 140 in response to the second group of dial impulses. The operation of the circuit for energizing the stepping magnet Y in response to the second group of dial impulses is now the same as that previously described in connection with the operation of the stepping magnet X and will not be again described. The energization of the stepping magnet Y in response to the second group of dial impulses steps the switch in the other direction to move the switch brushes T', R', and S' into engagement with the wire banks.

Assuming the wire bank for the desired called line to be idle as indicated by absence of ground to the sleeve brush S', the connector circuit will now operate to switch through and connect ringing current to the called line. To trace the operation of the circuit at this point, the X-delay relay 140 restores at the completion of the second group of dial impulses and ground through operated contacts 124, normal contacts 161, winding 170A of switching relay 170 and normal contacts 143 is connected to resistance battery on the sleeve brush S1 to cause switching relay 170 to operate. The resistance ground on the sleeve brush S1 is provided by the cut-off relay (not shown) in the line circuit of the calling line, and such cut-off relay therefore operates in series with the switching relay 170 as is conventional. The operation of the switching relay 170 establishes a holding circuit for itself through preliminary make contacts 171 from master ground on conductor 50 to winding 170B and battery. The operation of switching relay 170 opens contacts 172 to prevent the operation of the release magnet Z while the switching magnet 170 is energized and also closes contacts 173 to connect ground to the sleeve brush S1 and make the called line circuit busy to other connector switches and circuits. Operation of switching relay 170 also closes contacts 174 and 175 to connect the tip and ring brushes T' and R' to the connector tip and ring conductors 60 and 70, and ringing current from the ringing generator is thereby connected through winding 150B of ring trip relay 150 and normal contacts 154 and operated contacts 174 to the ring brush R' and the called line. The ringing generator is connected to battery but the ring trip relay does not operate since the direct current loop circuit is open until the called party answers. Operated contacts 176 of the switching relay 170 connect the condenser C10 to by-pass the normal contacts 154 and connect with the condenser C11 for providing ring-back tone through normal contacts 132 to the calling line conductor R. The operation of the switching relay 170 also operates contacts 177 and 178 to establish a circuit for energizing the answer bridge relay 130 when the ring trip relay 150 is operated after the called party answers.

When the called party answers, the direct current loop circuit between connector switch brushes T' and R' is closed and battery from the ringing generator is connected through ring trip relay winding 150B, normal contacts 154, operated contacts 174 and 175, and normal contacts 155 to ground to operate the ring trip relay 150. As the ring trip relay 150 operates, preliminary make contacts 151 are closed to provide a holding circuit from battery through winding 150A, operated contacts 151, and operated Y off-normal contacts 11A to master ground at conductor 50. The operation of ring trip relay 150 operates contacts 154 and 155 to connect the tip and ring brushes T' and R' and conductors 60 and 70 with condensers C11 and C12 and the calling line conductors T and R. At the same time, the answer bridge relay 130 is operated from battery through winding 130A, operated contacts 177, 154 and 174, called line loop circuit, operated contacts 175, 155 and winding 130B to operated contacts 178 and ground. The operation of answer bridge relay 130 operates contacts 133 to change the illumination of the bright-dim monitor lamp S10 to dim since the energization circuit is now from ground through resistor R10, operated contacts 112 to lamp S10 and battery. The operation of the answer bridge relay 130 also provides reverse battery supervision by the operation of contacts 131, 132, 135 and 136 as is well known.

In the previous paragraphs the operation of the connector circuit when seizing an idle called line has been described. In the event the called line is busy, ground will be applied to the sleeve brush S1 which, through normal contacts 143, prevents the operation of switching relay 170 after the X delay relay 140 restores since both sides of the winding 170A are connected to ground and the switching relay is thereby shunted. The testing of the called line by the sleeve brush S' will take place as soon as the sleeve brush encounters the called line in the wire bank of the switch and before the X-delay relay 140 has released and, therefore, the ground on the sleeve brush S' is first connected through operated contacts 144 to the busy test relay 160 and battery to operate such relay. The operation of the busy test relay 160 establishes a holding circuit for itself from master ground 50 at operated contacts 162 and through normal contacts 145 when the X-delay relay 140 finally releases at the completion of the second group of dial impulses. The operation of busy test relay 160 opens contacts 161 to additionally prevent the inadvertent operation of the switching relay 170, and also closes contacts 163 to connect busy tone signal through normal contacts 146 and 178 through winding 130B of the answer bridge relay 130 and condenser C12 to the calling line tip conductor T. It will be noted that the bright-dim monitor lamp S10 remains brightly illuminated while the connector circuit is seized but not switched through due to the busy condition of the called line. This is apparent when it is noted that the answer bridge relay 130 is not energized and contacts 133 are therefore in the normal position to shunt the resistor R10.

Assuming the connector circuit to have been directively operated to connect with a busy line and with only relays 110, 120 and 160 operated at this time, when the calling party hangs up, relays 110 and 120 are restored due to the breaking of the calling line loop circuit. The restoration of relay 120 removes master ground from the conductor 50 at normal contacts 122 so that the busy test relay 160 also restores. At the same time, the restoration of relay 120 restores contacts 125 to their normally closed position to connect ground through normal contacts 172, 125, and operated X and Y off-normal contacts 10A and 10B to the release magnet Z and battery. Thus, the release magnet Z is energized and the switch is released to restore the switch brushes T′, R′ and S′ to normal, and during the energization of the release magnet Z the contacts 14A are operated to connect ground to the incoming sleeve conductor S and prevent seizure of the connector circuit while the switch is returning to normal.

Now, assuming the connector switch to have been directively operated to seize an idle called line and the call is completed by the answering of the called party, relays 110, 120, 130, 150 and 170 are all operated as described before. The circuit arrangement is such that so long as the answer bridge relay 130 and the switching relay 170 are operated, the connector switch of release magnet Z cannot be operated since the energization circuit is therefore open at operated contacts 172. For example, should the calling party hang up first, relays 110 and 120 would restore to release preceding switch equipment by removing ground on the sleeve and the X-delay relay becomes operated from ground through operated contacts 134 of the answer bridge relay 130, normal contacts 122 and winding 140A to battery and, consequently, the busy test relay 160 would become energized from ground through operated contacts 173 of the switching relay 170 and operated X-delay contacts 144 to battery. With the busy test relay 160 thus operated, ground is connected through operated contacts 164 to the incoming sleeve conductor S to take the place of the guarding ground formerly applied through contacts 121 when release delay relay 120 had been energized by the calling line loop circuit. Thereafter when the called party hangs up, the answer bridge relay 130 is restored to restore contacts 134 and remove the holding ground from the master ground conductor 50 and winding 170B of the switching relay 170 thus restoring the switching relay 170 and completing the circuit for the release magnet Z through normal contacts 172 and 125 as previously described.

During the time interval when the calling party has hung up but the called party has not hung up, as described in the foregoing paragraph, the bright-dim monitor lamp S10 is again brightly illuminated to indicate that the connector circuit is seized or held by the called line but is not in the talking condition since the calling bridge relay 110 and release delay relay 120 are restored. This circuit may be traced from ground through operated contacts 133 and 165 it being understood that the busy test relay 160 is operated along with the X-delay relay 140 when the answer bridge relay 130 is maintained operated by the called line loop circuit. When the called line loop circuit is opened by the calling party hanging up, relays 130, 140, 150, 160 and 170 all restore to complete the energization circuit for the release magnet Z. It is not believed necessary to trace in detail the operation of the circuits for restoring such relays and operating the release magnet since such circuits have already been previously described in detail and are obvious from the drawing.

There has been described above an improved form of connector circuit having a monitor lamp signal arrangement for providing relatively different degrees of lamp illumination to indicate the various operative conditions of the circuit; i. e., idle, seized, and in the talking condition. There has also been disclosed a novel connector circuit relay arrangement in which the X-delay relay 140 is reoperated during the second group of dial impulses to thereby control the energization of both stepping magnets of the switch sequentially in response to a first group of dial impulses, and then a second group of dial impulses. In this connection, the ring trip relay 150 has been described for switching the connections of the X-delay relay from one stepping magnet to the other after the first group of dial impulses has been received. It should be obvious that the circuit arrangement of the invention may be used with various forms of two motion connector switches and is not limited to a connector switch of the so-called flat type having two motions perpendicular to each other in the same plane.

Various modifications may be made within the spirit of the invention and the scope of the appended claims.

What we claim is:

1. A monitor signal lamp circuit to indicate the operative condition of a telephone connector for selectively connecting a preceding circuit to a succeeding circuit, said connector having incoming connections to said preceding circuit and outgoing connections to said succeeding circuit and switch means therebetween, said switch means being effective when operated to establish a circuit connecting said incoming connections to said outgoing connections, including in combination, a power source, a signal lamp, a resistance, circuit means responsive to connection of said connector to said preceding circuit to connect said lamp directly to said source of power, circuit means responsive to connection of said connector to said succeeding circuit to connect said lamp directly to said source of power, and circuit means responsive to operation of said switch means and the connection of said connector to both said preceding and succeeding circuits for connecting said lamp to said power source in series with said resistance.

2. A connector for connecting a preceding circuit to a succeeding circuit in a telephone system and having a monitor signal lamp arrangement including in combination, a power source, a resistance, a signal lamp, a first relay adapted to be operated when said connector is connected to said preceding circuit, a second relay adapted to be operated when said connector is connected to said succeeding circuit and not connected to said preceding circuit, a third relay adapted to be operated when said connector is switched through to connect said preceding circuit to said succeeding circuit, circuit means including operated contacts of said first relay and normal contacts of said third relay to connect said signal lamp directly to said power source to brightly illuminate said lamp, circuit means including operated contacts of both said second and third relays to connect said signal lamp directly to said power source to brightly illuminate said lamp, and circuit means including operated contacts of said first and third relays to connect said lamp in series with said resistance to said power source to dimly illuminate said lamp.

3. A connector for connecting a preceding circuit to a succeeding circuit in a telephone system and having a monitor signal lamp arrangement including in combination, a power source, a resistance, a signal lamp, a first relay adapted to be operated when said connector is connected to said preceding circuit, a second relay adapted to be operated when said connector is switched through to connect said preceding circuit to said succeeding ciruit, circuit means including operated contacts of said first relay and normal contacts of said second relay to connect said signal lamp directly to said power source to brightly illuminate said lamp, and circuit means including operated contacts of both said first and second relays to connect said lamp in series with said resistance to said power source to dimly illuminate said lamp.

4. A connector circuit for directively controlling the primary and secondary movements of a two motion connector switch in response to dial impulses including in combination, first and second relays, means to operate both of said first and second relays when said connector circuit is first seized and only during transmission of a first group of dial impulses, means to reoperate said first relay only during transmission of a second successive group of dial impulses, means including operated contacts of both said first and second relays to cause directive primary motion of said switch by said first group of dial impulses, and means including operated contacts of said first relay and normal contacts of said second relay to cause directive secondary motion of said switch by said second group of dial impulses.

5. A connector circuit for directively controlling the energization of primary and secondary impulsing magnets of a two motion connector switch in response to dial impulses including in combination, first and second relays, means to operate both of said first and second relays when said connector circuit is first seized and during transmission of a first group of dial impulses, means to restore said first and second relays after transmission of said first group of dial impulses, means to reoperate only said first relay during transmission of a second successive group of dial impulses, means including operated contacts of both said first and second relays to impulsively energize said primary magnet and cause directive primary motion of said switch by said first group of dial impulses, and means including operated contacts of said first relay and normal contacts of said second relay to impulsively energize said secondary magnet and cause directive secondary motion of said switch by said second group of dial impulses.

6. A telephone system connector circuit having a two motion connector switch and first and second stepping magnets to be successively energized to directively operate the switch and connect preceding telephone circuits to selected succeeding telephone circuits including in combination, a first release delay relay, circuit means to operate said first relay when the connector circuit is first seized by said preceding circuit, a second relay, circuit means to operate said second relay when the connector circuit is first seized by said preceding circuit, a holding circuit including operated contacts of said first relay to maintain said second relay operated, a circuit path to the first of said stepping magnets established by the operation of said first and second relays, circuit means responsive to maintain said first relay operated during a first group of dial impulses and to impulsively energize said first stepping magnet through said first circuit path to thereby move said switch off-normal in a first direction, a first off-normal switch, means to operate said first off-normal switch when said switch steps off-normal in the first direction, circuit means including contacts of said off-normal switch to restore said first release delay relay at the completion of said first group of dial impulses to break said holding circuit and thereby restore said second relay, circuit means including other contacts of said first off-normal switch and normal contacts of said second relay to reoperate said first relay, a second circuit path including operated contacts of said first relay and normal contacts of said second relay to connect to said second stepping magnet, means to impulsively energize said second stepping magnet through said second circuit path in response to a second successive group of dial impulses and to maintain said first relay reoperated during said second group of dial impulses to thereby move said switch off-normal in a second direction to connect with a selected succeeding circuit, circuit means to restore said first release delay relay at the completion of said second group of dial impulses, a third relay, circuit means established by connection of said switch to said succeeding circuit when said succeeding circuit is idle and including normal contacts of said first relay to operate said third relay, circuit means including operated contacts of said third relay to apply ringing current to said succeeding line, and circuit means including operated contacts of said third relay responsive to the completion of a loop circuit through said succeeding circuit to reoperate said second relay, said second relay having operated contacts to disconnect the ringing current from the selected succeeding circuit and to connect the preceding circuit to the selected succeeding circuit through operated contacts of both said second and third relays.

7. A telephone system connector circuit having a two motion connector switch and first and second stepping magnets to be successively energized to directively operate the switch and connect preceding telephone circuits to selected succeeding telephone circuits including in combination, a first release delay relay, circuit means to operate said first relay when the connector circuit is first seized by said preceding circuit, a second relay, circuit means to operate said second relay when the connector circuit is first seized by said preceding circuit, a holding circuit including operated contacts of said first relay to maintain said second relay operated, a circuit path to the first of said stepping magnets established by the operation of said first and second relays, circuit means responsive to maintain said first relay operated during a first group of dial impulses and to impulsively energize said first stepping magnet through said first circuit path to thereby move said switch off-normal in a first direction, a first off-normal switch, means to operate said first off-normal switch when said switch steps off-normal in the first direction, circuit means including contacts of said off-normal switch to restore said first release delay relay at the completion of said first group of dial impulses to break said holding circuit and thereby restore said second relay, circuit means including other contacts of said first off-normal switch and normal contacts of said second relay to reoperate said first relay, a second circuit path including operated contacts of said first relay and normal contacts of said second relay to connect to said second stepping magnet and means to impulsively energize said second stepping magnet through said second circuit path in response to a second successive group of dial impulses and to maintain said first relay reoperated during said second group of dial impulses to thereby move said switch off-normal in a second direction to connect with a selected succeeding circuit.

8. A telephone system connector circuit having a two motion connector switch adapted to be directively operated in a first direction and then in a second direction to connect preceding telephone circuits to selected succeeding telephone circuits including in combination, a first release delay relay, circuit means to operate said first relay when the connector circuit is first seized by said preceding circuit, a second relay, circuit means to operate said second relay when the connector circuit is first seized by said preceding circuit, a holding circuit including operated contacts of said first relay to maintain said second relay operated, circuit means including operated contacts of said first and second relays for maintaining said first relay operated during a first group of dial impulses and to impulsively operate said switch off-normal in a first direction in accordance with said first group of dial impulses, a first off-normal switch, means to operate said first off-normal switch when said switch steps off-normal in the first direction, circuit means to restore said first release delay relay at the completion of said first group of dial impulses to break said holding circuit and thereby restore said second relay, circuit means including the operated contacts of said first off-normal switch and normal contacts of said second relay to reoperate said first relay, circuit means including operated contacts of said first relay and normal contacts of said second relay to impulsively operate said switch off-normal in the second direction to connect with a selected succeeding circuit in response to a second successive group of dial impulses, circuit means to maintain said first release delay relay reoperated during said second group of dial impulses and to restore said first release delay relay at the completion of said second group of dial impulses, a third relay, circuit means established by connection of said switch to said succeeding circuit when said succeeding circuit is idle and including normal contacts of said first relay to operate said third relay, circuit means including operated contacts of said third relay to apply ringing current to said succeeding line, and circuit means including operated contacts of said third relay responsive to the completion of a loop circuit through said succeeding circuit to reoperate said second relay, said second relay having operated contacts to disconnect the ringing current from the selected succeeding circuit and to connect the preceding circuit to the selected succeeding circuit through operated contacts of both said second and third relays.

9. A telephone system connector circuit having a two motion connector switch adapted to be directively operated in a first direction and then in a second direction to connect preceding telephone circuits to selected succeeding telephone circuits including in combination, a first release delay relay, circuit means to operate said first relay when the connector circuit is first seized by said preceding circuit, a second relay, circuit means to operate said second relay when the connector circuit is first seized by said preceding circuit, a holding circuit including operated contacts of said first relay to maintain said second relay operated, circuit means including operated contacts of said first and second relays for maintaining said first relay operated during a first group of dial impulses and to impulsively operate said switch off-normal in a first direction in accordance with said first group of dial impulses, a first off-normal switch, means to operate said first off-normal switch when said switch steps off-normal in the first direction, circuit means including contacts of said off-normal switch to restore said first release delay relay at the completion of said first group of dial impulses to break said holding circuit and thereby restore said second relay, circuit means including other contacts of said first off-normal switch and normal contacts of said second relay to reoperate said first relay, circuit means including operated contacts of said first relay and normal contacts of said second relay to impulsively operate said switch off-normal in the second direction to connect with a selected succeeding circuit in response to a second successive group of dial impulses, and circuit means to maintain said first release delay relay reoperated during said second group of dial impulses and to restore said first release delay relay at the completion of said second group of dial impulses.

10. A telephone system connector circuit having a two motion connector switch adapted to be directively operated in a first direction and then in a second direction to connect preceding telephone circuits to selected succeeding telephone circuits including in combination, a calling bridge relay, means to operate said calling bridge relay in response to the seizure of said connector circuit by a preceding telephone circuit, a release delay relay, circuit means including operated contacts of said calling bridge relay to operate said delay relay when the connector circuit is first seized by said preceding circuit, a ring trip relay, circuit means including operated contacts of said calling bridge relay to operate said trip relay when the connector circuit is first seized by said preceding circuit, a holding circuit including operated contacts of said delay relay to maintain said trip relay operated, circuit means including operated contacts of said delay and trip relays for maintaining said delay relay operated during a first group of dial impulses and to impulsively operate said switch off-normal in a first direction in accordance with said first group of dial impulses, a first off-normal switch, means to operate said first off-normal switch when said switch steps off-normal in the first direction, circuit means to restore said delay relay at the completion of said first group of dial impulses to break said holding circuit and thereby restore said trip relay, circuit means including the operated contacts of said first off-normal switch and normal contacts of said trip relay to reoperate said delay relay, circuit means including operated contacts of said delay relay and normal contacts of said trip relay to impulsively operate said switch off-normal in the second direction to connect with a selected succeeding circuit in response to a second successive group of dial impulses, circuit means to maintain said delay relay reoperated during said second group of dial impulses and to thereafter restore said delay relay at the completion of said second group of dial impulses, a switching relay, circuit means established by connection of said switch to said succeeding circuit when said succeeding circuit is idle and including normal contacts of said delay relay to operate said switching relay, circuit means including operated contacts of said switching relay to apply ringing current to said succeeding line, an answer bridge relay, circuit means including operated contacts of said switching relay responsive to the completion of a loop circuit through said succeeding circuit to reoperate said ring trip relay, said trip relay having operated contacts to disconnect the ringing current from the selected succeeding circuit, and circuit means including operated contacts of said trip relay to operate said answer relay and connect the preceding circuit to the selected succeeding circuit through operated contacts of said trip, answer and switching relays.

11. A telephone system connector circuit having a two motion connector switch adapted to be directively operated in a first direction and then in a second direction to connect preceding telephone circuits to selected succeeding telephone circuit including in combination, a calling bridge relay, means to operate said calling bridge relay in response to the seizure of said connector circuit by a preceding telephone circuit, a release delay relay, circuit means including operated contacts of said calling bridge relay to operate said delay relay when the connector circuit is first seized by said preceding circuit, a ring trip relay, circuit means including operated contacts of said calling bridge relay to operate said trip relay when the connector circuit is first seized by said preceding circuit, a holding circuit including operated contacts of said delay relay to maintain said trip relay operated, circuit means including operated contacts of said delay and trip relays for maintaining said delay relay operated during a first group of dial impulses and to impulsively operate said switch off-normal in a first direction in accordance with said first group of dial impulses, a first off-normal switch, means to operate said first off-normal switch when said switch steps off-normal in the first direction, circuit means to restore said delay relay at the completion of said first group of dial impulses to break said holding circuit and thereby restore said trip relay, circuit means including the operated contacts of said first off-normal switch and normal contacts of said trip relay to reoperate said delay relay, circuit means including operated contacts of said delay relay and normal contacts of said trip relay to impulsively operate said switch off-normal in the second direction to connect with a selected succeeding circuit in response to a second successive group of dial impulses, circuit means to maintain said delay relay reoperated during said second group of dial impulses and to thereafter restore said delay relay at the completion of said second group of dial impulses, a switching relay, circuit means established by connection of said switch to said succeeding circuit when said succeeding circuit is idle and including normal contacts of said delay relay to operate said switching relay, circuit means including operated contacts of said switching relay to apply ringing current to said succeeding line, an answer bridge relay, circuit means including operated contacts of said switching relay responsive to the completion of a loop circuit through said succeeding circuit to reoperate said ring trip relay, said trip relay having operated contacts to disconnect the ringing current from the selected succeeding circuit, circuit means including operated contacts of said trip relay to operate said answer relay and connect the preceding circuit to the selected succeeding circuit through operated contacts of said trip, answer and switching relays, a power source, a resistance, a monitor signal lamp, circuit means including operated contacts of said calling bridge relay to connect said lamp directly to said source of power, and circuit means including operated contacts of said answer bridge relay and said calling bridge relay to connect said resistance in series with the circuit establishing the connection of said lamp to said power supply by said calling bridge relay.

12. A telephone system connector circuit having a two motion connector switch adapted to be directively operated in a first direction and then in a second direction to connect preceding telephone circuits to selected succeeding telephone circuits including in combination, a calling bridge relay, means to operate said calling bridge relay in response to the seizure of said connector circuit by a preceding telephone circuit, a release delay relay, circuit means including operated contacts of said calling bridge relay to operate said delay relay when the connector circuit is first seized by said preceding circuit, a ring trip relay, circuit means including operated contacts of said calling bridge relay to operate said trip relay when the connector circuit is first seized by said preceding circuit, a holding circuit including operated contacts of said delay relay to maintain said trip relay operated, circuit means including operated contacts of said delay and trip relays for maintaining said delay relay operated during a first group of dial impulses and to impulsively operate said switch off-normal in a first direction in accordance with said first group of dial impulses, a first off-normal switch, means to operate said first off-normal switch when said switch steps off-normal in the first direction, circuit means to restore said delay relay at the completion of said first group of dial impulses to break said holding circuit and thereby restore said trip relay, circuit means including the operated contacts of said first off-normal switch and normal contacts of said trip relay to reoperate said delay relay, circuit means including operated contacts of said delay relay and normal contacts of said trip relay to impulsively operate said switch off-normal in the second direction to connect with a selected succeeding circuit in response to a second successive group of dial impulses, circuit means to maintain said delay relay reoperated during said second group of dial impulses and to thereafter restore said delay relay at the completion of said second group of dial impulses, a switching relay, circuit means established by connection of said switch to said succeeding circuit when said succeeding circuit is idle and including normal contacts of said delay relay to operate said switching relay, circuit means including operated contacts of said switching relay to apply ringing current to said succeeding line, circuit means including operated contacts of said switching relay responsive to the completion of a loop circuit through said succeeding circuit to reoperate said ring trip relay, said trip relay having operated contacts to disconnect the ringing current from the selected succeeding circuit, circuit means including operated contacts of said trip relay to operate said answer relay and connect the preceding circuit to the selected succeeding circuit through operated contacts of said trip, answer and switching relays, a busy test relay, a power source, a resistance, a monitor signal lamp, circuit means including operated contacts of said busy test relay to connect said lamp directly to said power source, and circuit means to operate said busy test relay when said preceding circuit loop is disconnected from said connector switch circuit and said succeeding circuit loop is connected to said connector switch circuit.

13. A telephone system connector circuit having a two motion connector switch adapted to be directively operated in a first direction and then in a second direction to connect preceding telephone circuits to selected succeeding telephone circuits including in combination, a calling bridge relay, means to operate said calling bridge relay in response to the seizure of said connector circuit by a preceding telephone circuit, a release delay relay, circuit means including operated contacts of said calling bridge relay to operate said delay relay when the connector circuit is first seized by said preceding circuit, a ring trip relay, circuit means including operated contacts of said calling brige relay to operate said trip relay when the connector circuit is first seized by said preceding circuit, a holding circuit including operated contacts of said delay relay to maintain said trip relay operated, circuit means including operated contacts of said delay and trip relays for maintaining said delay relay operated during a first group of dial impulses and to impulsively operate said switch off-normal in a first direction in accordance with said first group of dial impulses, a first off-normal switch, means to operate said first off-normal switch when said said switch steps off-normal in the first direction, circuit means to restore said delay relay at the completion of said first group of dial impulses to break said holding circuit and thereby restore said trip relay, circuit means including the operated contacts of said first off-normal switch and normal contacts of said trip relay to reoperate said delay relay, circuit means including operated contacts of said delay relay and normal contacts of said trip relay to impulsively operate said switch off-normal in the second direction to connect with a selected suceeding circuit in response to a second successive group of dial impulses, circuit means to maintain said delay relay reoperated during said second group of dial impulses and to thereafter restore said delay relay at the completion of said second group of dial impulses, a switching relay, circuit means established by connection of said switch to said succeeding circuit when said succeeding circuit is idle and including normal contacts of said delay relay to operate said switching relay, circuit means including operated contacts of said switching relay to apply ringing current to said succeeding line, an answer bridge relay, circuit means including operated contacts of said switching relay responsive to the completion of a loop circuit through said succeeding circuit to reoperate said ring trip relay, said trip relay having operated contacts to disconnect the ringing current from the selected succeeding circuit, circuit means including operated contacts of said trip relay to operate said answer relay, to connect the preceding circuit to the selected succeeding circuit through operated contacts of said trip, answer and switching relays, a busy test relay, a power source, a resistance, a monitor signal lamp, circuit means including operated contacts of said busy test relay to connect said lamp directly to said power source, circuit means to operate said busy test relay when said preceding circuit loop is disconnected from said connector switch circuit and said succeeding circuit loop is connected to said connector switch circuit, circuit means including operated contacts of said calling bridge relay to connect said lamp directly to said source of power, and circuit means including operated contacts of said answer bridge relay to connect said resistance in series with the circuit establishing the connection of said lamp to said power supply by the operation of said calling bridge relay.

References Cited in the file of this patent

UNITED STATES PATENTS 2,375,678 Newdstedt ............... May 8, 1945